United States Patent
Toth et al.

(10) Patent No.: US 6,257,587 B1
(45) Date of Patent: Jul. 10, 2001

(54) RADIAL LIP SEAL HAVING PROTECTED POROUS DUST EXCLUDER

(75) Inventors: David Michael Toth, Brighton; Bhawani Sanker Tripathy, Canton; John C. Kapcoe, Southgate, all of MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/316,422

(22) Filed: May 21, 1999

(51) Int. Cl.[7] .................................................. F16J 15/32
(52) U.S. Cl. ...................... 277/309; 277/349; 277/551; 277/562; 277/566; 277/918
(58) Field of Search ................................. 277/301, 309, 277/349, 411, 551, 562, 565, 566, 570, 571, 918

(56) References Cited

U.S. PATENT DOCUMENTS

| | | |
|---|---|---|
| 2,299,590 | 10/1942 | Reynolds . |
| 4,208,057 | 6/1980 | Messenger . |
| 4,226,426 | 10/1980 | Messenger . |
| 4,277,072 * | 7/1981 | Forch . |
| 4,342,448 * | 8/1982 | Wallis . |
| 4,448,425 * | 5/1984 | Von Berger . |
| 4,696,479 | 9/1987 | Karcher . |
| 4,770,548 | 9/1988 | Otto . |
| 4,819,949 | 4/1989 | Otto . |
| 4,848,776 * | 7/1989 | Winckler . |
| 4,943,068 * | 7/1990 | Hatch et al. . |
| 5,009,435 * | 4/1991 | Villanyi et al. . |
| 5,022,659 | 6/1991 | Otto . |
| 5,024,364 | 6/1991 | Nash . |
| 5,024,449 * | 6/1991 | Otto . |
| 5,028,054 | 7/1991 | Peach . |
| 5,129,744 | 7/1992 | Otto et al. . |
| 5,183,269 * | 2/1993 | Black et al. . |
| 5,201,533 | 4/1993 | Lederman . |
| 5,209,502 * | 5/1993 | Savoia . |
| 5,219,434 * | 6/1993 | Von Bergen et al. . |
| 5,511,886 * | 4/1996 | Sink . |
| 5,755,444 * | 5/1998 | Carnis et al. . |
| 6,056,467 * | 5/2000 | De Laforcade . |

* cited by examiner

*Primary Examiner*—Anthony Knight
*Assistant Examiner*—Vishal Patel
(74) *Attorney, Agent, or Firm*—Reising, Ethington, Barnes, Kisselle, Learman & McCulloch, P.C.

(57) ABSTRACT

A shaft seal assembly includes an outer stationary carrier, an inner member, and a sealing system including a primary lubricant-retention seal that is fixed to the carrier in combination with a number of debris-excluding seal features. Such features include a first debris-exclusion seal fixed to the carrier adjacent the primary seal and a second debris-exclusion seal that is mounted on either the carrier or inner member and has at least one lip sealingly engaging the other of the carrier and inner member in spaced relation to the first debris-exclusion lip defining a sealed annular cavity therebetween. Disposed within the cavity is a porous filter element in the preferred form of an open cell sponge. The various dust exclusion features cooperate to allow each to perform efficiently. The outermost second debris-exclusion seal guards the foam against substantial debris, and the foam in turn protects the first debris-exclusion lip against virtually all debris. That which escapes the filter is prevented by the first seal member from contacting the primary oil-retention lip.

24 Claims, 4 Drawing Sheets

FIG-3

RADIAL LIP SEAL HAVING PROTECTED POROUS DUST EXCLUDER

BACKGROUND OF THE INVENTION

1. Technical Field

This invention relates generally to shaft seals and more particularly to such seals having debris-excluding features.

2. Related Prior Art

Dynamic shaft seals are used in many automotive, machine, heavy equipment, construction, agricultural, industrial applications, etc., for sealing the opening in a case or housing through which a rotating shaft extends. The seal functions to contain a lubricant such as oil on one side of the seal and to exclude contaminants on the opposite atmosphere or air side of the seal.

Numerous prior seals are known wherein a primary lubricant-retention lip is used in combination with a plurality of debris-excluding features which may take the form of shaft-engaging lips, elastomeric excluders, labyrinth passages, and porous filter elements. The present invention provides a particular combination and arrangement of dust excluding features that cooperate with one another to protect the primary lubricant-retention seal from contaminants while permitting each feature to perform its debris-excluding task in an efficient manner.

SUMMARY OF THE INVENTION AND ADVANTAGES

The present invention is directed particularly to a dynamic shaft seal assembly particularly suitable for operation in severe debris-laden operating environments. The assembly comprises an outer annular carrier member, an inner member, a primary lubricant-retention seal fixed to the carrier, and a plurality of debris-excluding features, including a first debris-exclusion seal fixed to the carrier, a second debris-exclusion seal fixed on either the carrier or the inner member and sealingly engaging the other member in spaced relation to the first debris-exclusion seal defining a sealed space therebetween, and a porous filter disposed in the sealed space.

The various dust-exclusion features are arranged and cooperate in a way that allows each to perform efficiently to exclude debris from reaching the lubricant-retention seal. The second debris-retention seal is provided upstream of the debris path from the porous filter and operates to exclude the bulk of any debris from entering the seal assembly. The porous filter, then, operates in a cleaner environment and is more efficient at entrapping and filtering out any contaminants that do pass the second debris-exclusion lip over a prolonged period to protect to the first debris-exclusion seal from such contaminants. While little debris is expected to reach the first debris-exclusion seal, that which may is more readily excluded by the first debris-exclusion seal from reaching the primary lubricant retention lip.

This multi-stage debris-exclusion sealing approach has further advantages in that it enables the primary oil-retention seal as well as the first debris-exclusion seal to be fabricated of low friction PTFE material if preferred for improved seal performance and longer seal life.

BRIEF DESCRIPTION OF THE DRAWINGS

These and other features and advantages of the present invention will become more readily appreciated when considered in connection with the following detail description and appended drawings, wherein.

DETAILED DESCRIPTION

Figure 1:
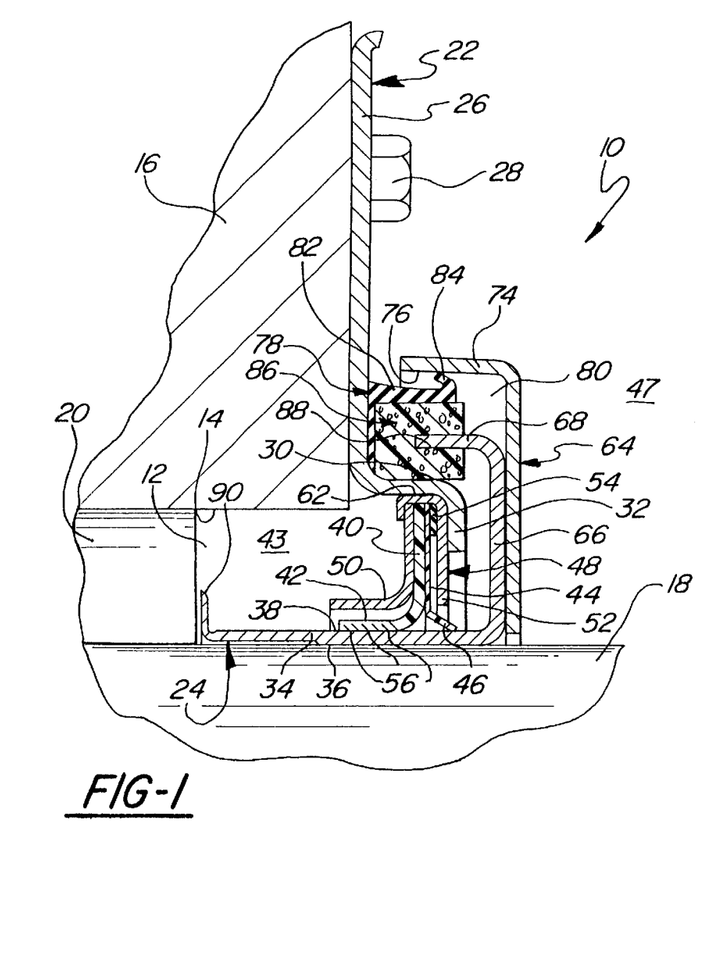
FIG. 1 is a fragmentary cross-sectional view of a shaft seal assembly according to a first embodiment of the invention.
Figure 2:
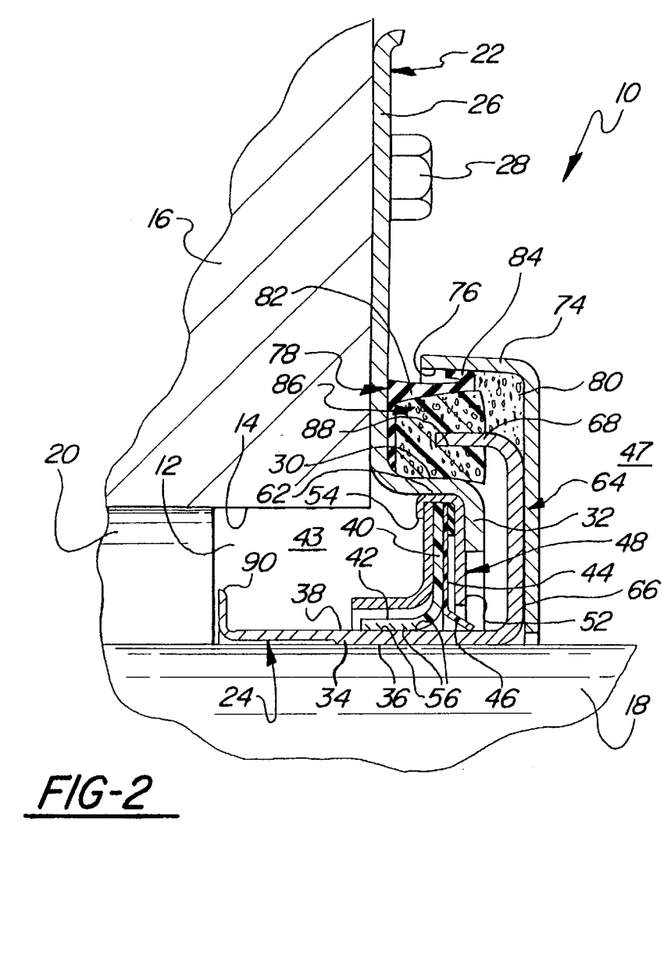
FIG. 2 is an enlarged fragmentary sectional view of the seal assembly of FIG. 1 illustrating the self-sealing feature of the debris-excluding seals as they wear.

A dynamic unitized shaft seal assembly constructed according to a first presently preferred embodiment of the invention is shown generally at 10 in FIGS. 1 and 2 for use in sealing an annular gap 12 between a bore or opening 14 of a housing 16 and the outer surface of a shaft 18 extending through the bore 14. The shaft 18 is journaled by bearing 20 for rotation relative to the housing 16. In the illustrated examples of FIGS. 1–7, the shaft may comprise a crank shaft of an internal combustion engine or the shaft of a machine tool or other equipment which extends through an associated opening in a housing which journals the shaft.

The unitized seal assembly 10 of FIGS. 1 and 2 includes an outer annular carrier member 22 and an inner member 24 in the form of an annular wear sleeve member. Both members 22, 24 are fabricated of rigid material and preferably of suitable steel formed by stamping. The carrier 22 is fixed to the stationary housing 16 and the wear sleeve 24 is mounted on and rotatable with the shaft 18 relative to the housing 16. The carrier 22 includes an annular face ring portion 26 encircling the bore 14 and mounted to the housing 16 such as by bolts 28. The carrier 22 is formed with a shoulder portion 30 extending axially outwardly from the face ring 26 adjacent the wall of the bore 14 and terminating in a radial flange portion 32 extending radially inwardly from the shoulder portion 30.

The wear sleeve 24 includes a radially inner cylindrical body portion 34 having an inner diameter surface 36 of a size adapted to be press-fit onto the outer surface of the shaft 18, and an outer diameter cylindrical sealing surface 38.

The carrier 22 mounts a primary lubricant-retention seal 40 having at least one radial lip 42 supported in sealing engagement with the surface 38 of the wear sleeve 24 on an oil side 43 of the seal assembly 10. The carrier 22 also mounts at least a first debris-exclusion seal 44 having at least one lip 46 sealingly engaging the surface 38 of the wear sleeve 24 on an atmosphere or air side 47 of the seal assembly 10. The seals 40, 44 in this embodiment of the invention are preferably integrated in a seal cartridge 48. The seals 40, 44 in this embodiment comprise a pair of annular wafers with preferably at least the lip 42 of the lubricant-retention seal 40 and more preferably the entire seal 40 fabricated of polytetrafluoroethylene (PTFE)-based material which may include the usual fillers, etc. The first debris-exclusion seal 44 is fabricated also of a flexible material and preferably PTFE as well, although other seal materials such as elastomers are contemplated by the invention. The seals 40, 44 are clamped at their radial outer regions between inner and outer metal cases 50, 52 and preferably incorporating an elastomeric washer 54 to provide a fluid tight seal between the cases 50, 52 and seal members 40, 44. The seals 40, 44 could alternatively be adhered or bonded to the carrier according to known techniques. The seals 40, 44 extend radially inwardly from the cases 50, 52 a sufficient distance to sealingly engage the surface 38 of the wear sleeve 24.

At least the lubricant-retention seal 40 is formed with hydrodynamic features in the preferred form of one or more spiraling grooves or slits 56 which cooperate with the rotating wear sleeve 24 to generate a hydrodynamic pumping action which redirects any lubricant, such as oil, that finds its way beneath the lip 42 from the protected oil side 43 of the seal back to the oil side. The lip 46 of the first debris-exclusion seal 44 may likewise include hydrodynamic features which act in the same way to redirect any debris that may find its way beneath the lip 46 back to the air side 47 of the seal assembly 10. As illustrated, the lip 42 of seal member 40 preferably is bent so as to lay down on the surface 38 and extend axially toward the oil side 43. The lip 46 of seal member 44 is likewise preferably bent and extends in the axially opposite direction toward the air side 47.

The cartridge 48 is press-fit into an annular cup-shaped recess 62 formed by the shoulder and radial flange portions 30, 32 of the carrier member 22 such that the seal members 40, 44 are fixed against rotation on the carrier 22.

The wear sleeve 24 terminates at its axially outer air side and in an end flange 64. The end flange 64 includes a radial portion 66 extending radially outwardly of the cylindrical body portion 34 of the wear sleeve 24 and spaced axially outwardly of the carrier 22. A first axial shield portion 68 extends from the radial portion 66 axially inwardly toward the carrier 22. The first axial shield portion 68 is spaced radially outwardly of the shoulder portion 30 of the carrier 22 in overlapping relation thereto. The end flange 64 further includes a second axial shield portion 74 extending from the radial portion 66 axially inwardly toward the carrier 22 in radially outwardly spaced parallel overlying relation to the first axial shield portion 68. The second axial shield portion 74 has an inner diameter seal surface 76.

The seal assembly 10 further includes a second debris-exclusion seal 78 fixed to the carrier 22 and sealingly engaging the wear sleeve 24 on the air side 47 of the seal assembly 10 in spaced relation to the lip 46 of the first debris-exclusion seal 44 so as to define an annular cavity or protected space 80 therebetween. The second seal member 78 preferably includes an elastomeric seal body 82 bonded to the face ring 26 of the carrier 22 and extending axially outwardly from the carrier 22 beneath the second axial shield portion 74 of the wear sleeve 24 in radially outwardly spaced relation to the shoulder 30 of the carrier 22. The body 82 carries at least one elastomeric lip 84 projecting radially outwardly from the body 82 and sealingly engaging the inner surface 76 of the second axial shield portion 74.

Still referring initially to FIGS. 1 and 2, a porous filter element 86 is disposed within the cavity 80 and is spaced from the primary seal 40 on one side by the first debris-exclusion seal 44 and protected from direct exposure to the outside atmosphere on the opposite side by the second debris-exclusion seal 78. The filter element 86 preferably comprises an open cell sponge preferably fabricated of a synthetic material such as polyurethane/polyester foam having a preferred density of about 2 lbs/ft$^3$ and a porosity of about 64 pores/in. The pores of the sponge 86 are preferably packed with grease or an equivalent medium, allowing air to pass through the filter while assisting in entrapping and filtering out any debris contained in the air.

While the sponge 86 occupies only a portion of the volume of the cavity 80, it is so positioned as to require all air passing by the second debris-exclusion seal 78 to pass through the filter 86 first before encountering the first debris-exclusion seal 44. The overlapping or interleaving of the axial shield portions 68, 74 of the wear sleeve 24 with the shoulder portion 30 and seal body 82 define a tortuous path through the cavity 80 which, by their arrangement, effectively establish a labyrinth sealing effect. The sponge 86 in this embodiment is fixed to the carrier member 22 and occupies the space between the shoulder portion 30 of the carrier 22 and the body 82 of the second debris-exclusion seal 78, and extends axially from the face ring 26 of the carrier 22 outwardly beyond the free end of the axial shield portion 68. The sponge 86 is formed with an annular groove 88 facing axially toward the air side 47 and accommodating the axial shield portion 68 within the groove 88. The groove 88 may be preformed in the sponge 86 prior to installation of the shield portion 68, or may be formed through effective displacement of the resilient sponge medium by simply extending the rigid shield portion 68 into the ungrooved sponge 86.

The sponge 86 is supported in such manner as to provide relative rotational movement between it and the shield portion 68. The sponge 86 may be fixed to the carrier 22 by any suitable means such as bonding directly to the metal carrier material and/or to the elastomeric second seal member 78 or simply through an interference fit. Such a construction and positioning of the sponge 86 preserves the interleaved arrangement and labyrinth seal effect described above while filtering all air that passes through the tortuous path. The accommodation of the axial shield portion 68 of the wear sleeve 24 within the groove 88 establishes a further dynamic labyrinth seal. Any air passing into the groove 88 encounters the rotating axial shield portion 68 which is in wiping contact with the walls of the groove 88 causing any debris contained in the air to be collected by the sponge 86.

The sponge 86 is preferably thicker than the radial spacing between the shoulder portion 30 and body 82 of the second debris-exclusion seal 78. The sponge 86 is also resilient and as such exerts a constant radially outward expansion force on the body 82 of seal 78, urging its lip 84 constantly toward engagement with the seal surface 76 of the shield 74. Such expansion force also reacts inwardly of the groove 88 to constantly compress the walls of the groove 88 against the rotating axial shield portion 68 of the war sleeve 24.

The cylindrical body portion 34 of the wear sleeve 24 is formed on its opposite oil side end with a radially outwardly turned retaining flange 90 which serves to lock and unitize the wear sleeve 24 and its components with the carrier 22 and its components.

In operation, the wear sleeve 24 of the seal assembly 10 is press-fit onto the shaft 18 and the carrier 22 secured to the housing 16 to close the gap 12. It is the object of the seal assembly 10 to prevent dust and other abrasive debris present on the air side 47 from passing by the seal to the protected oil side 43 thereof which could present problems for lubricated working components (not shown) within the housing 16.

Any debris-laden air moving toward the gap 12 first encounters the second axial shield portion 74 of the wear sleeve 24 which redirects some of the contaminated air away from the seal. A certain portion of the contaminated air is expected to reach the second debris-exclusion seal 78, where the dynamic sealing engagement between the lip 84 and surface 76 of the axial shield portion 74 act to exclude a further portion of the contaminated air from entering the seal. Inevitably, a fraction of the contaminated air will find its way past the lip 84 and will enter the cavity 80. Prior to reaching the first debris-exclusion seal 44, however, such air must first pass through the porous filter 86 which entraps and removes substantially all remaining debris from the air flow, such that the air which exists the filter 86 and encounters the first debris-exclusion seal 44 is substantially free of abrasive contaminants. Any small amount which does pass by the filter 86 is prevented from reaching the primary lubricant-retention seal 40 by action of the first debris-exclusion seal 44.

The above described multi-stage sealing arrangement is designed so that each stage operates in a highly efficient manner. The second axial shield portion 74 acts to shield a great portion of the debris from contacting the second elastomeric seal member 78, allowing it to operate more efficiently in a relatively cleaner environment and prolonging its life. The elastomeric seal 78, in turn, excludes a further amount of debris from reaching the porous filer 86, enabling it to operate more efficiently in a relatively cleaner environment for a longer period of time than it would without the seal member 78. The filter 86, in turn, enables the first debris-exclusion seal 44 to operate more efficiently in a cleaner environment, thereby extending its life and the life of the primary lubricant-retention seal 40. Such relationship among the various sealing features enables usage of highly efficient seal materials for each feature. Elastomers, such as any of a number of rubber compounds including NGR, etc. commonly used in sealing applications is employed as the second debris-exclusion seal material for its ability to operate effectively at a low wear rate in a dry, abrasive environment. The first debris-exclusion seal 44, on the other hand, is preferably fabricated of PTFE material. PTFE is preferred because of its low friction, low pressure sealing abilities. However, PTFE wears in the presence of abrasive contaminants. The second seal 78 and sponge 86 protect the first seal 44 from such contaminants, thereby permitting PTFE to be used.

FIG. 2 illustrates another advantageous feature of the invention involving the interaction between the filter 86 and the second seal member 78. Over time, the lip 84 of the seal 78 will inevitably wear. As debris enters the cavity 80 and is entrapped in the filter 86, it increases the bulk or volume of the filter 86, causing it to expand in the cavity 80 and urging the lip 84 of the seal member 78 further toward engagement with the associated seal surface 76. As such, the seal member 78 and filter 86 cooperate in a self-healing manner so as to maintain or even increase the sealing effectiveness of the lip 84 as it wears.

Figure 3:
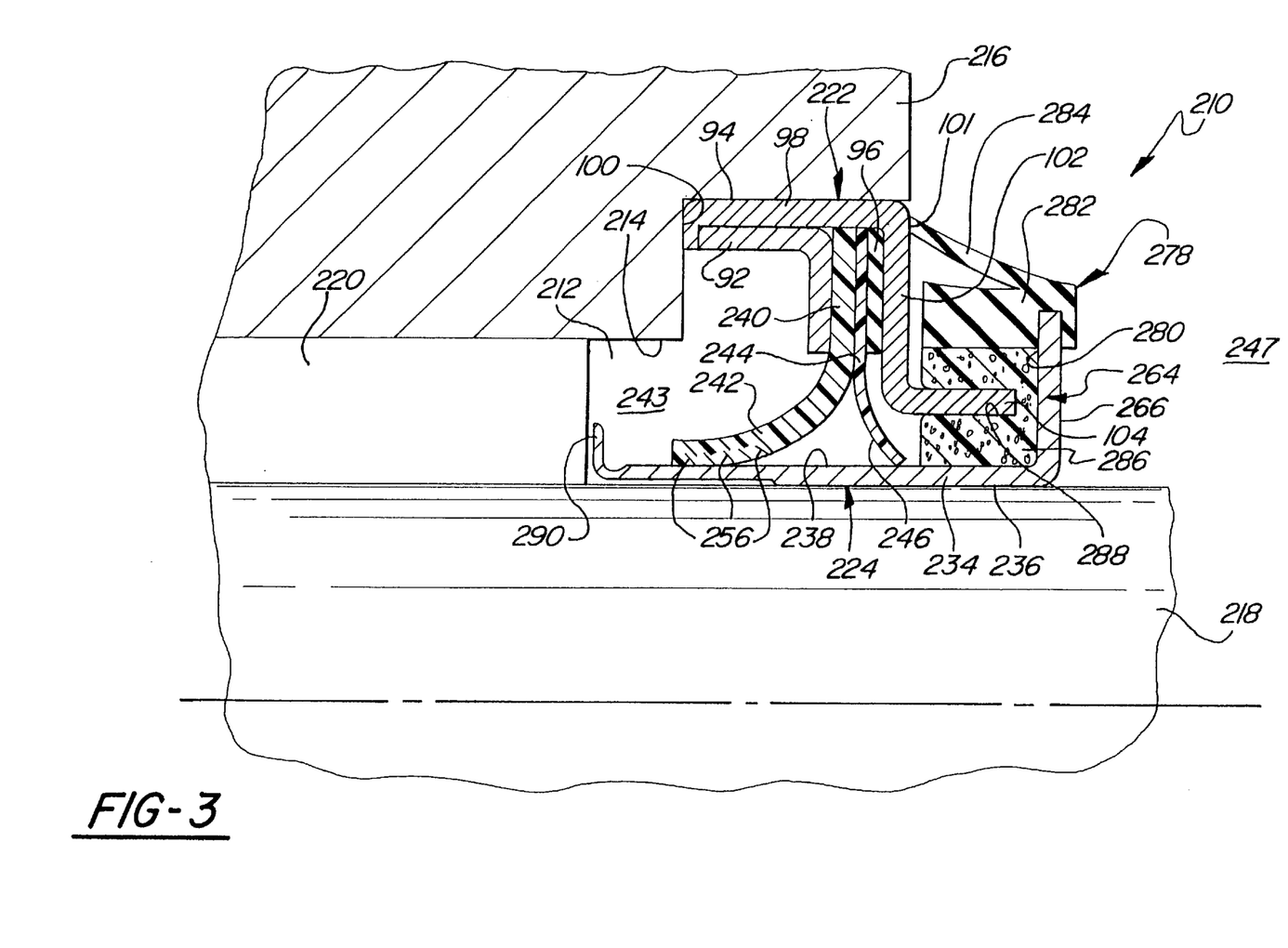
FIG. 3 is a fragmentary cross-sectional view of a shaft seal assembly constructed according to a second embodiment of the invention.

A second embodiment of the invention is illustrated in FIG. 3 and operates in similar fashion. For the sake of clarity, the same reference numerals are used to indicate corresponding features in common with the first embodiment of FIGS. 1 and 2, but are offset by 200.

The seal assembly 210 of FIG. 3 is likewise of a unitized construction having a carrier 222, a wear sleeve 224, a primary lubricant-retention seal 240, a first debris-exclusion seal 244, a second debris-exclusion seal 278, and a porous filter element 286 contained within a cavity 280 between the first and second debris-exclusion seals.

The carrier 222 of the second embodiment may be of the type wherein the seals 240 and 244 are clamped between inner and outer metallic case portions 92 and 94 and sealed by a gasket 96 in conventional manner. The seal members 240, 244 could alternatively be bonded to the carrier 222.

The carrier 222 further includes a radially inwardly extending flange 102 that terminates in an axial shield portion 104 projecting away from the seals 240, 244 toward the air side 247.

The wear sleeve 224 includes a cylindrical body portion 234 and radial end flange portion 266, but lacks the axial portion 68 of the first embodiment. Unlike the first embodiment, the second debris-exclusion seal 278 is molded on the free end of the radial portion 266 of the wear sleeve flange 264 and its lip 284 projects axially inwardly and sealingly engages a sealing surface face 101 of the radial flange 102 of the carrier 222.

The porous filter element 286 is similar in construction and operation, except that in the second embodiment it is disposed on and rotates with the wear sleeve 224, and its groove 288 opens axially inward toward the oil side of the seal assembly 210 and receives an axially outwardly extending shield portion 104 of the wear sleeve 224 projecting into the filter 286. It will be appreciated that the operation of the seal assembly 210 is essentially the same as that of the first embodiment, except that the relationship between the filter 286 and axial shield portion 104 has been reversed, such that the filter element 286 rotates with the wear sleeve 224 relative to the stationary shield portion 104.

Further embodiments of seal assemblies according to the invention are illustrated in FIGS. 4–7 which incorporate the multi-stage dust-exclusion features of the invention, including first and second dust-excluding seals having the porous filter element therebetween working in cooperation to allow each to perform efficiently at protecting the lubricant-retaining seal of the assembly from exposure to contaminants from the outside dust-laden environment. The embodiments of FIGS. 4–7 thus illustrate how the same multi-stage debris-excluding features can be employed in numerous different seal configurations to protect the primary lubricant-retention lip, it being understood that seal configurations other than those specifically shown in the drawings incorporating the multi-stage dust-excluding features are contemplated within the scope and spirit of the invention, the embodiments shown being for purposes of illustration rather than limitation.

Figure 4:
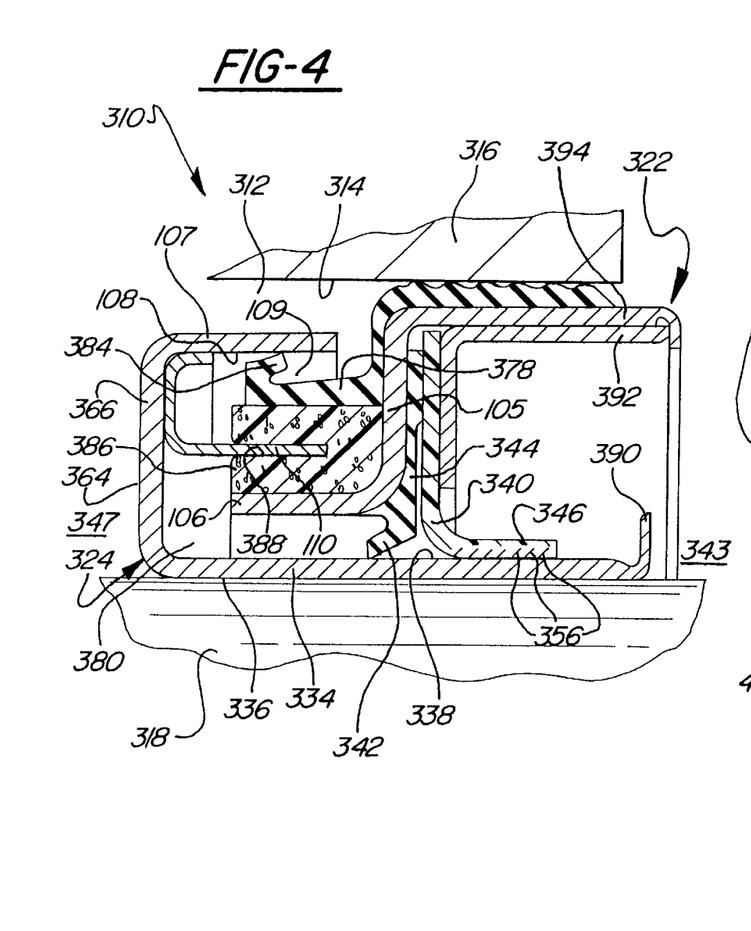
FIG. 4 is a fragmentary cross-sectional view of a shaft seal assembly constructed according to a third embodiment of the invention.

FIG. 4 illustrates a third embodiment of the invention in which the same reference numerals are employed as used in the first embodiment of FIGS. 1 and 2, but offset by 300. The seal assembly 310 of FIG. 4 is similarly of a unitized construction having an outer carrier member 322, a wear sleeve 324, a primary lubricant-retention seal 340, a first debris-exclusion seal 344, a second debris-exclusion seal 378, and a porous filter element 386 disposed within an annular space 380 between the first and second debris-exclusion seals.

The carrier 322 includes similar inner and outer annular metallic case portions 392, 394 as those shown in the FIG. 3 embodiment joined to clamp seals 340 and 344 therebetween. As with all the embodiments, the seals 340 and 344 could alternatively be bonded to the carrier.

The carrier 322 includes a radial flange 105 that, like the flange 102 of the FIG. 3 embodiment, terminates in an axial shield portion 106 projecting away from the seals 340, 344 toward the air side 347 of the seal assembly 310 in radially outwardly spaced relation to the cylindrical body 334 of the wear sleeve 324. The wear sleeve 324 includes a radial end flange 366 extending radially outwardly of the body portion 334 terminating in an axially inwardly turned free end portion 107 extending toward the carrier 322 defining an inner cylindrical sealing surface 108 spaced radially outwardly from the flange 105 of the carrier 322.

The cylindrical sealing surface 338 of the wear sleeve 324 is sealingly engaged by the primary lubricant-retention seal 340 and first debris-exclusion seal 344, the seals being preferably directed in axially opposite directions, and at least the lubricant-retention seal 340 laying down against the surface 338 and provided with the hydrodynamic features 356.

The second debris-exclusion seal 378 is disposed in this embodiment on the carrier 322 and extends axially outwardly from the radial flange 105 of the carrier 322 in radially outwardly spaced relation to the axial portion 106 of the carrier 322. The seal 378 has a lip 384 which sealingly engages the inner surface 108 of the wear sleeve 338, and preferably is formed so as to turn back upon the seal 378 providing a trough-shaped channel 109, which is similarly formed in the seal 78 of the first embodiment. The channel 109 has the advantage of catching water and debris and channeling it around the outer perimeter of the seal 378 where is can drop from the lower extremity thereby directing such contaminants away from entry into the seal.

The porous filter element 386 is of the same type and mounted in this embodiment on the axial portion 106 of the carrier 322 in radially outwardly biasing engagement with the second debris-exclusion seal 378, urging the lip 384 toward constant sealing engagement with the seal surface 108 in the same manner as that of the filter 86 of the first embodiment of FIGS. 1 and 2.

The wear sleeve 324 mounts an axial shield portion 110 that extends axially inwardly from the radial portion 366 and projects into the filter element 386 within a corresponding groove 388 in the same manner as described previously.

It will be appreciated that the operation of the seal assembly 310 of the FIG. 4 embodiment is essentially the same as those of the FIG. 1–2 embodiments, with the filter 386 remaining stationary with the carrier 322 and the shield portion 110 rotating with the wear sleeve 324 relative to the filter 386.

Figure 5:
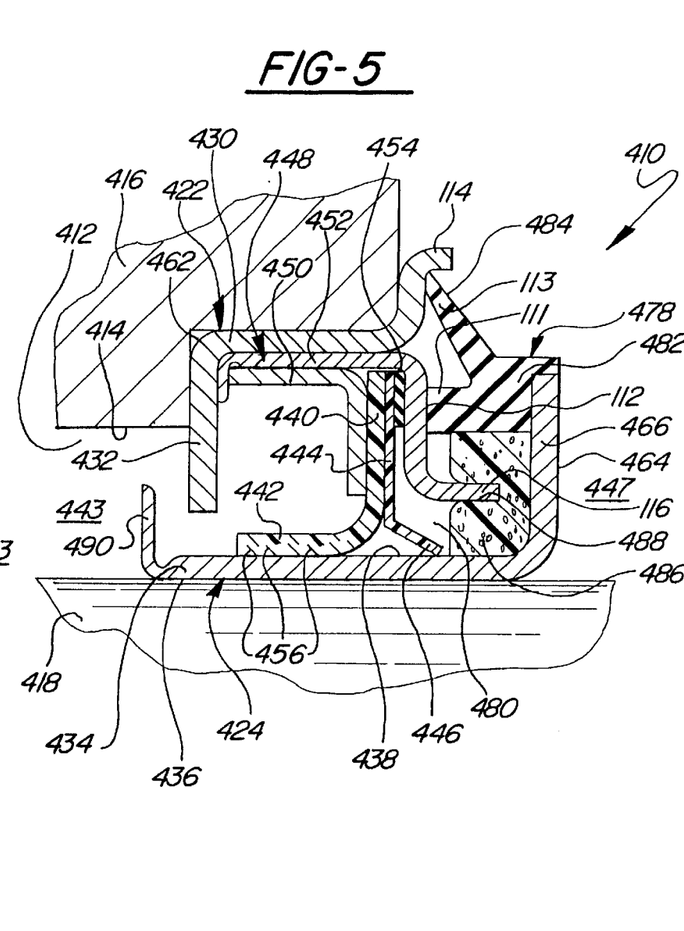
FIG. 5 is a fragmentary cross-sectional view of a shaft seal assembly constructed according to a fourth embodiment of the invention.

FIG. 5 illustrated a fourth embodiment of a seal 410 of the invention, wherein the same reference numerals are again used to indicated corresponding features in common with the first embodiment of FIGS. 1 and 2, but are offset by 400.

The seal assembly 410 of FIG. 5 is also of unitized construction having a carrier 422, a wear sleeve 424, a primary lubricant-retention seal 440, first and second debris-exclusion seals 444 and 478, and a porous filter element 486 in the space 480 between the first and second debris-exclusion seals. The carrier 422 has an axial shoulder 430 and radial flange 432 portion providing a recess 462 in which a seal cartridge 448 is press fit to become one with the carrier 422. The cartridge 448 includes similar inner and outer cases 450, 452 between which are clamped the lubricant-retention seal 440, the first debris-exclusion seal 444, and a gasket 454. The seal 440 may similarly be formed with hydrodynamic features 456 and is bent axially toward the oil side 443 so as to lay down against the cylindrical surface 438 of the body 434 of the wear sleeve 424 to provide a dynamic seal of the gap 412.

The radial end flange 466 mounts the second debris-exclusion seal 478 at its radial outer free end in spaced relation to the first debris-exclusion seal 444. The body 482 of the seal 478 has a thrust pad 111 that confronts an axial face 112 of the outer case 452. The lip 484 of the seal 478 engages an axial sealing face 113 of the carrier 422. The carrier 422 includes an axial debris-deflecting flange 114 that axially overlies the lip 484 in radially outward relation thereto to deflect debris as it approaches the lip 484 to help prevent the entry of such debris into the seal past the lip 484.

The porous filter element 486 is mounted on the wear sleeve 424 between the debris-exclusion seals 444 and 478 within the sealed space 480 therebetween, and thus rotates with the wear sleeve 424 relative to the carrier 422. The outer case 452 of the carrier is formed with an axial shield portion 116 that extends axially away from the carrier 422 toward the air side 447 and projects into the filter 486 so as to be received in the groove 488.

The operation of the seal of the FIG. 5 embodiment is very similar to that of the FIG. 3 embodiment, in that the filter element 486 is disposed on and rotates with the wear sleeve 424 relative to the stationary shield portion 116 supported by the carrier 422.

Figure 6:
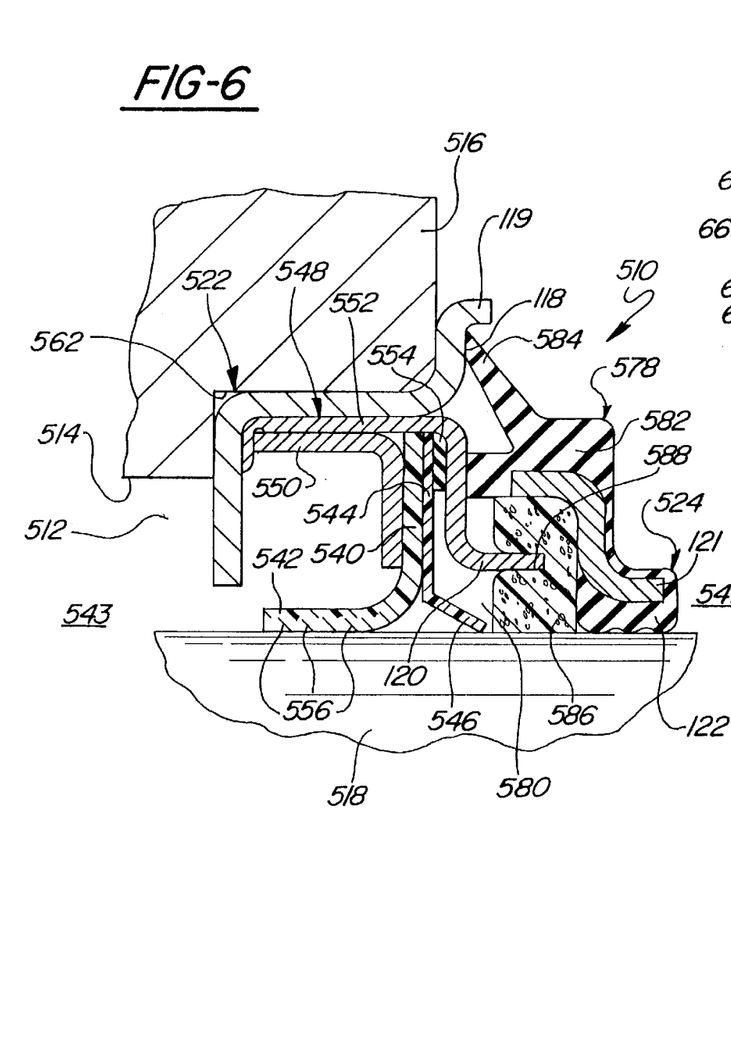
FIG. 6 is a fragmentary cross-sectional view of a shaft seal assembly constructed according to a fifth embodiment of the invention.
Figure 7:
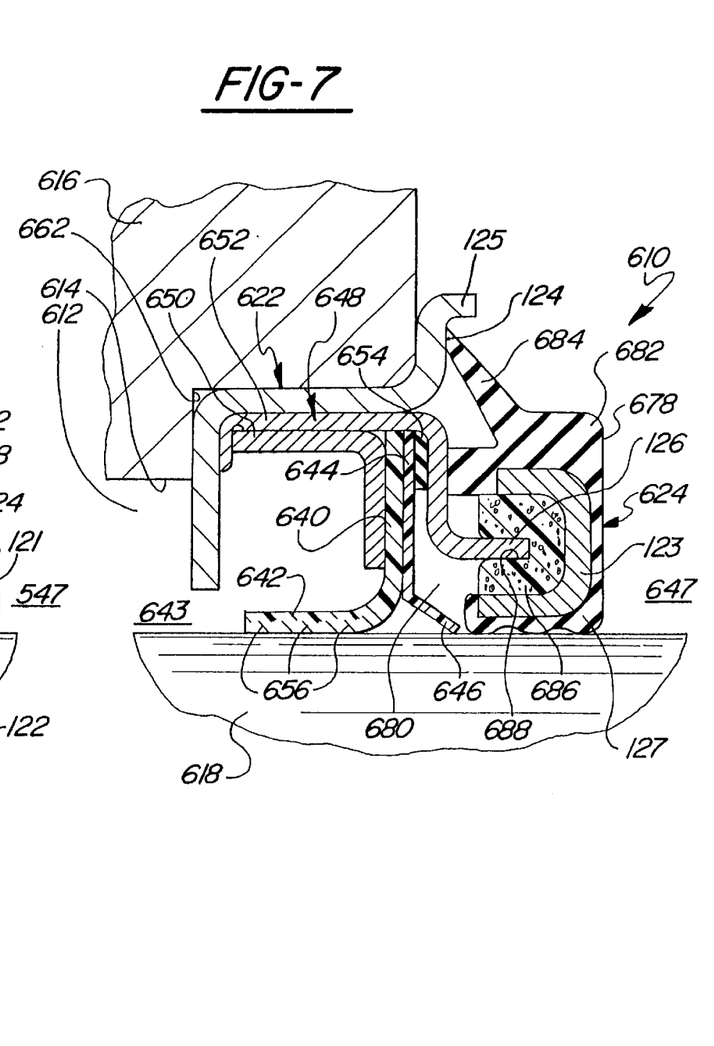
FIG. 7 is a fragmentary cross-sectional view of a shaft seal assembly constructed according to a sixth embodiment of the invention.

The FIG. 6 and 7 embodiments are essentially the same as that of the FIG. 5 embodiment except that the wear sleeve has been eliminated such that the lubricant-retention seals and first debris-exclusion seals run directly on and seal against the outer diameter sealing surface of the shaft, and the inner member, rather than being a wear sleeve, is in the form of an annular collar of non-unitized construction relative to the carrier member. As before, the same reference numerals are used to designate like features, but are offset by 500 and 600, respectively. The carrier 522 and seal cartridge 548 are the same as that described with respect to FIG. 5. The carrier 522 includes the sealing face 118 for the lip 584 of the second debris-exclusion seal 578, and the same axial debris-deflecting flange 119 as that of 114 of FIG. 5. The outer case 552 of the cartridge 548 includes the same axial shield portion 120 as that of 116 in FIG. 5.

The inner collar member 524 includes a metal reinforcement 121 about which an elastomer casing is molded including a pad 122 between the reinforcement 121 and the shaft 518 on the inner diameter, and the second debris-exclusion seal 578 molded on the outer diameter of the reinforcement 121. The seals 578, 678 are formed with the same thrust pad feature as that shown at 111 in FIG. 5. The filter element 586 is supported on the collar 524 for rotation therewith relative to the stationary shield portion 120 projecting axially into a groove 588 of the filter element 586 as before. The filter element 586 in this embodiment engages the shaft 518 as well.

The embodiment of FIG. 7 is identical to FIG. 6 except that the collar 624 has a metal reinforcement 123 having a generally U-shaped section shown in FIG. 7 providing a pocket for the filter 686. The carrier 622 includes the features of the axial sealing face 124 engaged by the lip 684 of the second debris-exclusion seal 678 and the debris-deflecting flange 125 extending over the lip 684, as well as the axial shield 126 projecting from the outer case 652 into the filter element 686. The collar 624 has a similar pad 127 for mounting in the shaft 618 and the integrated second debris-exclusion seal 678.

In use, the seal assemblies 510, 610 of FIGS. 6 and 7 are installed by mounting the carrier members 522, 622 on the stationary housing as shown, positioning the lubricant-retention and first debris-exclusion seals in dynamic sealing relation with the shaft 518, 618. The inner collar member 524, 624 is pressed onto the shaft and positioned relative to the carrier 522, 622 as shown in the figures to complete the seals.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A dynamic shaft seal assembly comprising:
   an outer carrier member mountable on a stationary housing;
   an inner member mountable on a rotatable shaft extending through an opening in the housing for rotation with the shaft relative to said outer carrier member;
   a lubricant-retention seal disposed on said carrier member;
   a first debris-exclusion seal disposed on said carrier member adjacent said lubricant-retention seal on an atmosphere side of said seal assembly;
   a second debris-exclusion seal disposed on one of said outer carrier and inner members and sealingly engaging a corresponding sealing surface of the other of said outer carrier and said inner members in spaced relation to said first debris-exclusion seal defining a protected space therebetween sealed from the outer atmosphere by said second debris-exclusion seal;
   a porous debris-trapping filter element disposed between said first and second debris-exclusion seals within said protected space; and
   a shield portion extending from one of said carrier and said inner members into said filter element with relative rotational movement permitted between said filter element and said shield portion.

2. The assembly of claim 1 wherein said lubricant-retention seal and said first debris-exclusion seal are supported for direct dynamic sealing engagement with the shaft, and said inner member comprises an annular collar axially adjacent said carrier member on an atmosphere side of said seal assembly mountable on the shaft for rotation therewith relative to said carrier member, said second debris-exclusion seal being disposed on said collar in dynamic sealing engagement with said carrier member, said filter element being disposed on said collar in said space between said first and second debris-exclusion seals for rotation relative to said carrier member and said carrier member including said shield portion extending into said rotatable filter element.

3. The assembly of claim 1 wherein said filter element comprises an open cell sponge.

4. The assembly of claim 1 wherein said filter element is fixed to said carrier member and is supported stationary, and said shield portion projects from said inner member and is rotatable within a groove of said filter element occupied by said shield portion.

5. The assembly of claim 1 wherein said shield portion projects from said carrier and is supported stationary, and said filter element is fixed to and rotatable with said inner member relative to said shield portion.

6. The assembly of claim 1 wherein said filter element comprises a resilient, open-cell sponge, said sponge confronting and constantly biasing said second dust-exclusion seal toward said sealing engagement.

7. The assembly of claim 6 wherein said sponge is packed with grease and operative to accumulate dust that may pass by said second dust-exclusion seal and expand in response thereto urging said second dust-exclusion seal increasingly toward said sealing engagement.

8. The assembly of claim 6 wherein said second debris-exclusion seal includes a trough-shaped channel exposed to atmosphere.

9. The assembly of claim 1 wherein said shield portion extends axially into said filter element.

10. The assembly of claim 1 wherein said lubricant-retention seal is fabricated of PTFE.

11. The assembly of claim 10 wherein said second debris-exclusion seal is fabricated of elastomeric material and said first debris-exclusion seal is fabricated of PTFE.

12. The assembly of claim 1 wherein said porous filter element comprises a sponge.

13. The assembly of claim 1 wherein said carrier member includes an axially extending shoulder portion and said second debris-exclusion seal is fixed to and projects axially from said carrier in radially outwardly spaced relation to said shoulder portion.

14. The assembly of claim 13 wherein said filter element comprises an open-cell sponge fixed on said shoulder portion of said carrier member having an annular groove therein opening axially away from said carrier member and occupied by said shield portion extending axially from said inner member.

15. The assembly of claim 14 wherein said inner member comprises a wear sleeve having an end flange spaced axially from said carrier member formed with a first axial portion extending toward said carrier member in overlapping radially outwardly spaced relation to said shoulder portion, and a second axial portion spaced radially inwardly of said first axial portion extending toward said carrier member and into said groove of said sponge defining said shield portion.

16. The assembly of claim 15 wherein said sponge constantly biases said second debris-exclusion seal toward said sealing engagement with said second axial portion of said end flange.

17. The assembly of claim 1 wherein said inner member comprises a wear sleeve having a cylindrical body with a cylindrical outer sealing surface sealingly engaging said lubricant-retention seal and said first debris-exclusion seal and a radially outwardly extending end flange mounting said second debris-exclusion seal for rotation therewith in radially outwardly spaced relation to said body of said wear sleeve in dynamic sealing engagement with a corresponding sealing surface of said carrier member.

18. The assembly of claim 17 wherein said filter element is disposed on said wear sleeve for rotation therewith and said carrier member includes said shield portion extending into said filter element.

19. The assembly of claim 1 wherein said inner member comprises a wear sleeve having a cylindrical body with a cylindrical outer sealing surface sealingly engaging said lubricant-retention seal and said first debris-exclusion seal and a radially outwardly extending end flange having an axially inwardly turned face end extending toward said carrier member defining an inner cylindrical sealing surface, said second debris-exclusion seal being fixed to said carrier and dynamically sealingly engaging said inner sealing surface of said wear sleeve flange in radially outwardly spaced relation to said body of said wear sleeve, said filter element being fixed to said stationary carrier in radially outwardly biasing engagement with said second debris-exclusion seal urging said second debris-exclusion seal toward said sealing engagement with said inner sealing surface of said wear sleeve flange, and said wear sleeve including said shield portion extending into said filter and rotatable with said wear sleeve relative to said filter element.

20. The assembly of claim 19 wherein said second dust-exclusion seal comprises a radial lip sealingly engaging an axial face surface of said carrier, and said carrier includes an axially outwardly extending debris-deflector portion overlying said lip of said second debris-exclusion seal in radially outwardly adjacent relation thereto.

21. A method of sealing an annular gap between a housing and a relatively rotatable shaft using a dynamic shaft seal assembly having an outer carrier member supporting a lubricant-retention seal and a first debris-exclusion seal, a relatively rotatable inner member, a second debris-exclusion seal disposed on one of the carrier and inner members in dynamic sealing relation with the other of said carrier and inner members in spaced relation to the first debris-exclusion seal providing a sealed space therebetween, and a porous debris-trapping filter disposed within such sealed space between the first and second debris-excluding seals, said method comprising:

mounting the outer carrier member on the housing;

mounting the inner member on the shaft in such relation to the carrier member that the seals are supported in dynamic sealing relation with corresponding sealing surfaces to close the gap, with the second debris-exclusion seal shielding the filter from direct exposure to the outside atmosphere and the filter in turn shielding the first debris-exclusion seal from direct exposure to contaminants of the atmosphere passing by the second debris-exclusion seal; and     including providing a shield portion on one of the carrier and inner members, and extending such shield portion into the filter while supporting the filter in such manner as to enable relative rotational movement between the filter and shield portion.

22. A dynamic shaft seal assembly comprising:

an outer carrier member mountable on a stationary housing;

an inner member mountable on a rotatable shaft extending through an opening in the housing for rotation with the shaft relative to said outer carrier member;

a lubricant-retention seal disposed on said carrier member;

a first debris-exclusion seal disposed on said carrier member adjacent said lubricant-retention seal on an atmosphere side of said seal assembly;

a second debris-exclusion seal disposed on one of said outer carrier and inner members and sealingly engaging a corresponding sealing surface of the other of said outer carrier and said inner members in spaced relation to said first debris-exclusion seal defining a protected space therebetween sealed from the outer atmosphere by said second debris-exclusion seal;

a porous debris-trapping filter element disposed between said first and second debris-exclusion seals within said protected space; and wherein said inner member comprises a wear sleeve having a cylindrical body with a cylindrical outer sealing surface sealingly engaging said lubricant-retention seal and said first debris-exclusion seal and a radially outwardly extending end flange mounting said second debris-exclusion seal for rotation therewith in radially outwardly spaced relation to said body of said wear sleeve in dynamic sealing engagement with a corresponding sealing surface of said carrier member.

23. A dynamic shaft seal assembly comprising:

an outer carrier member mountable on a stationary housing;

an inner member mountable on a rotatable shaft extending through an opening in the housing for rotation with the shaft relative to said outer carrier member;

a lubricant-retention seal disposed on said carrier member;

a first debris-exclusion seal disposed on said carrier member adjacent said lubricant-retention seal on an atmosphere side of said seal assembly;

a second debris-exclusion seal disposed on one of said outer carrier and inner members and sealingly engaging a corresponding sealing surface of the other of said outer carrier and said inner members in spaced relation to said first debris-exclusion seal defining a protected space therebetween sealed from the outer atmosphere by said second debris-exclusion seal;

a porous debris-trapping filter element disposed between said first and second debris-exclusion seals within said protected space; and wherein said inner member comprises a wear sleeve having a cylindrical body with a cylindrical outer sealing surface sealingly engaging said lubricant-retention seal and said first debris-exclusion seal and a radially outwardly extending end flange having an axially inwardly turned face end extending toward said carrier member defining an inner cylindrical sealing surface, said second debris-exclusion seal being fixed to said carrier and dynamically sealingly engaging said inner sealing surface of said wear sleeve flange in radially outwardly spaced relation to said body of said wear sleeve, said filter being fixed to said stationary carrier in radially outwardly biasing engagement with said second debris-exclusion seal urging said second debris-exclusion seal toward said sealing engagement with said inner sealing surface of said wear sleeve flange, and said wear sleeve including a shield portion extending into said filter and rotatable with said wear sleeve relative to said filter element.

24. A dynamic shaft seal assembly comprising:

an outer carrier member mountable on a stationary housing;

an inner member mountable on a rotatable shaft extending through an opening in the housing for rotation with the shaft relative to said outer carrier member;

a lubricant-retention seal disposed on said carrier member;

a first debris-exclusion seal disposed on said carrier member adjacent said lubricant-retention seal on an atmosphere side of said seal assembly;

a second debris-exclusion seal disposed on one of said outer carrier and inner members and sealingly engaging a corresponding sealing surface of the other of said outer carrier and said inner members in spaced relation to said first debris-exclusion seal defining a protected space therebetween sealed from the outer atmosphere by said second debris-exclusion seal;

a porous debris-trapping filter element disposed between said first and second debris-exclusion seals within said protected space; and wherein said lubricant-retention seal and said first debris-exclusion seal are supported for direct dynamic sealing engagement with the shaft, and said inner member comprises an annular collar axially adjacent said carrier member on an atmosphere side of said seal assembly mountable on the shaft for rotation therewith relative to said carrier member, said second debris-exclusion seal being disposed on said collar in dynamic sealing engagement with said carrier member, said filter element being disposed on said collar in said space between said first and second debris-exclusion seals for rotation relative to said carrier member and said carrier member including a stationary shield portion extending into said rotatable filter element.

* * * * *